United States Patent
Kondo (10) Patent No.: US 9,728,905 B2
(45) Date of Patent: Aug. 8, 2017

(54) MALE CONNECTOR AND FEMALE CONNECTOR

(71) Applicant: HOSIDEN CORPORATION, Yao-shi (JP)

(72) Inventor: Hayato Kondo, Yao (JP)

(73) Assignee: HOSIDEN CORPORATION, Yao-shi (JP)

(*) Notice: Subject to any disclaimer, the term of this patent is extended or adjusted under 35 U.S.C. 154(b) by 0 days.

(21) Appl. No.: 14/708,481

(22) Filed: May 11, 2015

(65) Prior Publication Data
US 2015/0325959 A1 Nov. 12, 2015

(30) Foreign Application Priority Data
May 12, 2014 (JP) ................................. 2014-098981

(51) Int. Cl.
*H01R 13/66* (2006.01)
*H01R 13/46* (2006.01)
(Continued)

(52) U.S. Cl.
CPC ........... *H01R 13/6633* (2013.01); *H01Q 1/40* (2013.01); *H01Q 1/44* (2013.01); *H01Q 7/00* (2013.01);
(Continued)

(58) Field of Classification Search
CPC ........................ Y10S 439/918; H01R 13/6633
(Continued)

(56) References Cited

U.S. PATENT DOCUMENTS 4,286,335 A * 8/1981 Eichler ................ H04B 1/3877
200/51.1
5,046,952 A * 9/1991 Cohen .................. H01R 12/727
439/63

(Continued)

FOREIGN PATENT DOCUMENTS

DE 102012107270 A1 2/2014
EP 1688025 A2 8/2006
(Continued)

OTHER PUBLICATIONS

Extended European Search Report issued on Sep. 24, 2015 for the counterpart European patent application No. 15020065.7.

*Primary Examiner* — Tulsidas C Patel
*Assistant Examiner* — Marcus Harcum
(74) *Attorney, Agent, or Firm* — Kratz, Quintos & Hanson, LLP (57) ABSTRACT

A male connector includes a male body and a male conductor. The male body includes an outer face including a first curved surface and a housing space on an inner side of the first curved surface of the male body. The male conductor is provided inside the housing space and includes a functional part. The functional part is a male communication antenna, a male power-transmission antenna, or a male power-reception antenna. A female connector includes a female body and a female conductor. The female body includes a connection hole, an inner wall surface of the connection hole, the inner wall surface including a first curved surface, a housing space on an outer side of the first curved surface of the connection hole of the female body. The female conductor is provided inside the housing space and includes a functional part. The functional part is a female communication antenna, a female power-reception antenna, or a female power-transmission antenna.

23 Claims, 5 Drawing Sheets (51) Int. Cl.
*H01Q 1/40* (2006.01)
*H04B 5/00* (2006.01)
*H01Q 1/44* (2006.01)
*H01Q 7/00* (2006.01)

(52) U.S. Cl.
CPC ......... *H01R 13/46* (2013.01); *H01R 13/6658* (2013.01); *H01R 13/6691* (2013.01); *H04B 5/0031* (2013.01); *H04B 5/0037* (2013.01)

(58) Field of Classification Search
USPC .................................................. 439/916, 581
See application file for complete search history.

(56) References Cited

U.S. PATENT DOCUMENTS

| | | | | |
|---|---|---|---|---|
| 5,936,581 | A * | 8/1999 | Roshitsh | H01P 1/10 200/51.1 |
| 6,685,383 | B2 * | 2/2004 | Rosenfeld | H01Q 1/088 343/906 |
| 6,860,761 | B2 * | 3/2005 | Lee | H01R 4/28 439/582 |
| 6,935,866 | B2 * | 8/2005 | Kerekes | H01R 9/0515 439/629 |
| 7,150,648 | B1 * | 12/2006 | Hall | H01R 24/50 439/581 |
| 7,156,675 | B2 * | 1/2007 | Nagata | H01R 24/46 439/188 |
| 8,542,159 | B2 * | 9/2013 | Taguchi | H01Q 1/38 343/702 |
| 8,747,121 | B1 * | 6/2014 | Hoffmann | H04N 5/64 439/63 |
| 8,773,325 | B2 * | 7/2014 | Chiang | H01Q 1/42 343/715 |
| 8,790,136 | B2 * | 7/2014 | Duesterhoeft | H01R 13/6583 439/101 |
| 9,496,000 | B2 * | 11/2016 | Gilson | G11B 27/036 |
| 2001/0005645 | A1 * | 6/2001 | Zech | H01R 24/46 439/188 |
| 2002/0173200 | A1 * | 11/2002 | Guidet | H01R 24/50 439/578 |
| 2008/0261446 | A1 * | 10/2008 | Arnaud | H01R 13/6315 439/578 |
| 2009/0264017 | A1 * | 10/2009 | Malstrom | H01R 24/52 439/607.01 |
| 2012/0268331 | A1 * | 10/2012 | Yang | H01Q 1/32 343/711 |
| 2014/0087571 | A1 * | 3/2014 | Su | H01R 13/111 439/57 |
| 2016/0254588 | A1 * | 9/2016 | Kim | H01Q 1/24 343/702 |

FOREIGN PATENT DOCUMENTS

| | | |
|---|---|---|
| EP | 2251931 A1 | 11/2010 |
| EP | 2581993 A1 | 4/2013 |
| JP | 2007-0208201 | 8/2007 |

* cited by examiner

MALE CONNECTOR AND FEMALE CONNECTOR

CROSS-REFERENCE TO RELATED APPLICATIONS

The present application claims priority under 35 U.S.C. §119 of Japanese Patent Application No. 2014-098981 filed on May 12, 2014, the disclosure of which is expressly incorporated by reference herein in its entity.

BACKGROUND OF THE INVENTION

Technical Field

The invention relates to male and female connectors.

Background Art

Japanese Unexamined Patent Publication No. 2002-246122 discloses a male connector and a female connector adapted for noncontact signal transmission. The male connector includes a male body and a male coil element. The male coil element is embedded in the male body by injection molding. The female connector includes a female body with a connection hole and a female coil element. The connection hole of the female body of the female connector can fittingly receive the distal portion of the male connector. The female coil element is embedded in the female body by injection molding.

SUMMARY OF INVENTION

There is a demand for modifying the above male and female connectors such that the male body has an outer face of curved shape in whole or in part, and that the female body has a connection hole with an inner wall surface of curved shape in whole or in part. However, it was difficult to meet such a demand for the following reasons. Of the outer faces of the male body of the male connector, the outer face in the vicinity of the male coil element has to be flat in accordance with the shape of a rigid circuit board to mount the male coil element. Similarly, of the inner wall surfaces of the connection hole of the female connector, the inner wall surface in the vicinity of the female coil element has to be flat in accordance with the shape of a rigid circuit board to mount the female coil element.

In view of the above circumstances, the invention provides a male connector having a curved surface on an outer face of a body. The invention also provides a female connector having a curved surface on an inner wall surface of a connection hole.

A male connector according to an aspect of the invention includes a male body and a male conductor. The male body includes an outer face including a first curved surface and a housing space on an inner side of the first curved surface of the male body. The male conductor is provided inside the housing space. The male conductor includes a functional part. The functional part is one of a male communication antenna, a male power-transmission antenna, and a male power-reception antenna.

In the male connector of this aspect, it is possible to provide a first curved surface in the outer face of the male body because the male conductor is disposed inside the housing space of the male body.

The male body may further include a second curved surface being a wall surface of the housing space. The second curved surface may curve in correspondence with a shape of the first curved surface of the male body and have an insulation property. The male conductor may be disposed on the second curved surface. The functional part of the male conductor may curve in correspondence with the shape of the first curved surface.

In the male connector of this aspect, it is easy to curve the functional part of the male conductor in correspondence with the shape of the first curved surface of the male body. This is achieved simply by providing the male conductor on the second curved surface because the second curved surface curves in correspondence with the shape of the first curved surface of the male body.

Alternatively, the male connector may further include a male insulator inside the housing space. The male insulator may curve in correspondence with a shape of the first curved surface of the male body. The male conductor may be disposed on the male insulator. The functional part of the male conductor may curve in correspondence with the shape of the first curved surface.

In the male connector of this aspect, it is easy to curve the functional part of the male conductor in correspondence with the shape of the first curved surface of the male body. This is achieved simply by providing the male conductor on the male insulator because the male insulator curves in correspondence with the shape of the first curved surface of the male body.

The male body may further include a second curved surface being a wall surface of the housing space. The second curved surface may curve in correspondence with a shape of the first curved surface of the male body. The male insulator may be fixed to the second curved surface.

The first curved surface of the outer face of the male body may be of tuboid shape. The second curved surface of the male body may be of tuboid shape concentric with the first curved surface of the male body.

The male connector of any of the above aspects may further include a male circuit. The male conductor may further include a connecting part to be electrically connected to the male circuit. The connecting part may curve in correspondence with the shape of the first curved surface of the male body.

The male connector may further include a male circuit board and a male control part. The male circuit board may be provided inside the housing space of the male body and electrically connected to the male circuit or to the male conductor. The male control part may be provided on the male circuit board.

A female connector according to an aspect of the invention includes a female body and a female conductor. The female body may include a connection hole, an inner wall surface of the connection hole, the inner wall surface including a first curved surface, a housing space on an outer side of the first curved surface of the connection hole of the female body. The female conductor is provided inside the housing space and includes a functional part. The functional part is one of a female communication antenna, a female power-reception antenna, and a female power-transmission antenna.

In the female connector of this aspect, it is possible to provide a first curved surface in the inner wall surface of the connection hole of the female body because the female conductor is disposed inside the housing space of the female body.

The female body may further include a second curved surface being a wall surface of the housing space. The second curved surface may curve in correspondence with a shape of the first curved surface of the connection hole and having an insulation property. The female conductor may be disposed on the second curved surface. The functional part of the female conductor may curve in correspondence with the shape of the first curved surface.

In the female connector of this aspect, it is easy to curve the functional part of the female conductor in correspondence with the shape of the first curved surface of the connection hole. This is achieved simply by providing the female conductor on the second curved surface because the wall surface of the housing space curves in correspondence with the shape of the first curved surface of the connection hole.

Alternatively, the female connector may further include a female insulator inside the housing space. The female insulator may curve in correspondence with the shape of the first curved surface of the connection hole. The female conductor may be disposed on the female insulator.

In the female connector of this aspect, it is easy to curve the functional part of the female conductor in correspondence with the shape of the first curved surface of the connection hole. This is achieved simply by providing the female conductor on the female insulator because the female insulator curves in correspondence with the shape of the first curved surface of the connection hole.

The female body may further include includes a second curved surface being a wall surface of the housing space. The second curved surface may curve in correspondence with a shape of the first curved surface of the connection hole. The female insulator may be fixed to the second curved surface.

The first curved surface of the inner wall surface of the connection hole may be of tuboid shape. The second curved surface may be of tuboid shape concentric with the first curved surface of the connection hole.

The female connector of any of the above aspects may further include a female circuit. The female conductor may further include a connecting part to be electrically connected to the female circuit. The connecting part may curve in correspondence with the shape of the first curved surface of the connection hole.

The female connector may further include a female circuit board and a female control part. The female circuit board may be provided inside the housing space of the female body and electrically connected to the female circuit or the female conductor. The female control part may be provided on the female circuit board.

DESCRIPTION OF EMBODIMENTS

The first and second embodiments of the invention will be described below. In the foregoing and following description, "male" and "female" are used to denote the part of the connector with which a component is associated, rather than denoting the actual form of the component. For example, "male control parts 150a" refers to control parts 150a which are associated with the male part of the connector, and similarly "female control parts 150b" refers to control parts 150b which are associated with the female part of the connector. In the foregoing and following description, relative spatial terms such as "upper", "lower", "upward", "downward", "top", "bottom", "left", "right", "front", "rear", "above", "below", etc., are used for the convenience of the skilled reader and refer to the orientation of the male and female connector and its respective constituent parts as depicted in the drawings. No limitation is intended by use of these terms, either in use of the invention, during its manufacture, shipment, custody, or sale, or during assembly of its constituent parts or when incorporated into or combined with other apparatus.

First Embodiment

A male connector 100a according to the first embodiment of the invention will be described below with reference to FIG. 1A to FIG. 2B. The male connector 100a includes a male body 110a, a plurality of male conductors 120a, a plurality of male circuits 130a, a male circuit board 140a, a plurality of male control parts 150a, and a cable 160a. Each constituent of the male connector 100a will be described below in detail.

Figure 1A:
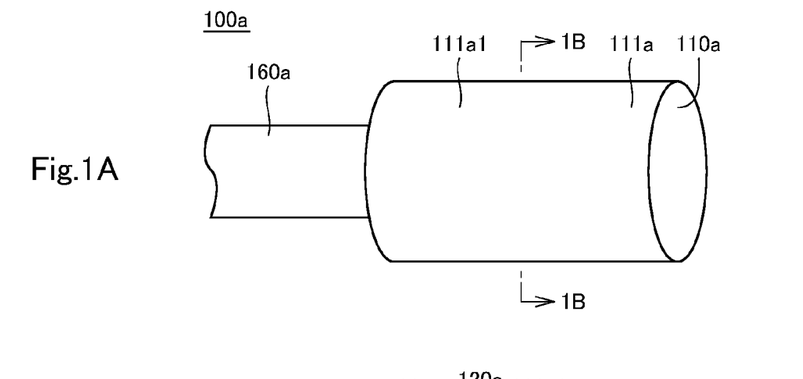
FIG. 1A is a schematic perspective view illustrating the front, top, right side of a male connector according to the first embodiment of the invention.
Figure 1B:
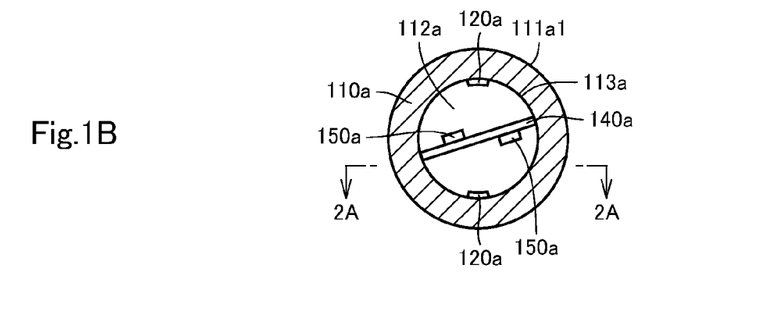
FIG. 1B is a sectional view of the male connector, taken along 1B-1B in FIG. 1A.

As best illustrated in FIG. 1A, the male body 110a is formed from insulating resin in substantially cylindrical shape. The male body 110a has an outer face 111a, a housing space 112a, and a wall surface 113a of the wall of the housing space 112a. The outer face 111a of the male body 110a includes a curved surface 111a1 (first curved face), which is a cylindrical or tuboid outer surface of the male body 110a. The curved surface 111a1 may be formed with a keyway or a key ridge not shown. As best illustrated in FIG. 1B, the housing space 112a is an enclosed cylindrical space inside the male body 110a (on an inner side of the curved surface 111a1) and in concentric relation to the curved surface 111a1. The wall surface 113a (second curved face) of the housing space 112a is a cylindrical or tuboid curved surface extending concentrically with the curved surface 111a1. The wall surface 113a curves in correspondence with the shape of the curved surface 111a1. In other words, the wall surface 113a curves such that every point on the functional part 121a (to be described) of each male conductor 120a is located at the same distance to the curved surface 111a1.

As illustrated in FIG. 1B, the conductors 120a of the male connector, referred to as "male conductors 120a," are conductive lines formed on the wall surface 113a of the housing space 112a and located inside the housing space 112a. The male conductors 120a may be patterned on the wall surface 113a, e.g. using the Laser Direct Structuring (LDS, registered trademark) technology. Specifically, the wall surface 113a containing an LDS may be irradiated with laser light to activate only the areas irradiated with the laser light, and the activated areas are metalized to form plated layers to serve as the male conductors 120a. Alternatively, the conductive lines can be formed on the wall surface 113a by any known suitable printing method. In FIG. 1B, the thickness of the male conductors 120a is exaggerated for convenience of illustration.

The male conductors 120a each include a functional part 121a and a connecting part 122a. Each functional part 121a is one of a male communication antenna for wireless signal communication (see FIG. 2A), a male power-transmission antenna for wirelessly transmitting electric power (see FIG. 2B), or a male power-reception antenna for wirelessly receiving electric power (see FIG. 2B). The functional parts 121a curve along the wall surface 113a. Since the wall surface 113a curves in correspondence with the shape of the curved surface 111a1 of the male body 110a as described above, the functional parts 121a accordingly curve in correspondence with the shape of the curved surface 111a1. This arrangement enables equalization of the distance from the functional parts 121a to the curved surface 111a1 throughout the parts. The connecting parts 122a may curve along the wall surface 113a (see FIG. 2B) or may extend without curving (see FIG. 2A).

Figure 2A:
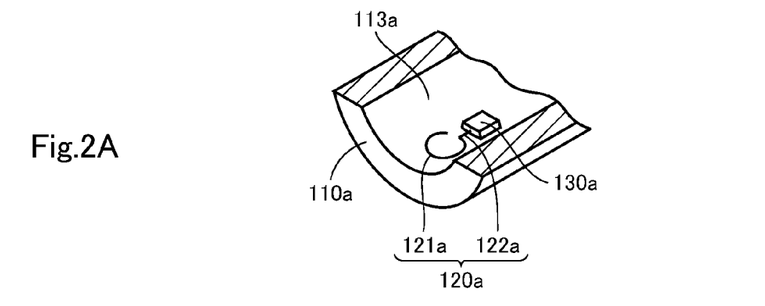
FIG. 2A is a partial sectional view of the male connector, taken along 2A-2A in FIG. 1B, and illustrates an example of the male conductor (male communication antenna) of the male connector.
Figure 2B:
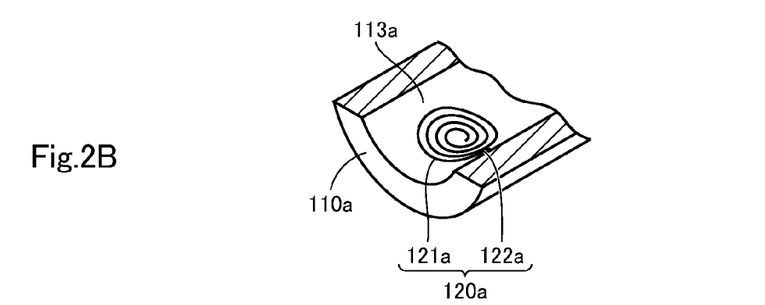
FIG. 2B is a partial sectional view of the male connector, taken along 2A-2A in FIG. 1B, and illustrates another example of the male conductor (male power-transmission antenna or male power-reception antenna) of the male connector.

The male circuits 130a may be provided on the wall surface 113a of the housing space 112a as illustrated in FIG. 2A. Alternatively, the male circuits 130a may be provided on the male circuit board 140a (not shown). In either case, the male circuits 130a are located inside the housing space 112a. The male circuits 130a are electrically connected to the respective connecting parts 122a of the male conductors 120a. In applications where the functional parts 121a of the male conductors 120a are male communication antennas, the male circuits 130a should be integrated circuits (ICs, i.e. communication circuits) for making the functional parts 121a transmit or receive signals. In applications where the functional parts 121a are male power-transmission antennas, the male circuits 130a should be power-transmission ICs (power-transmission circuits) for converting electric power from an external power source (not shown) into a form (e.g. high-frequency power) suitable for power transmission to the functional parts 121a by electromagnetic induction mode, electromagnetic field resonance mode, electric field coupling mode, or radio wave mode. In applications where the functional parts 121a are male power-reception antennas, the male circuits 130a should be power-reception ICs (power-reception circuits) for converting energy (electromagnetic waves etc.) received at the functional parts 121a into electric power.

The male circuit board 140a may be a rigid printed circuit board, a flexible printed circuit board (FPC), or a PET circuit board. The male circuit board 140a is disposed inside the housing space 112a. The male circuit board 140a is electrically connected to the connecting parts 122a of the male conductors 120a or to the male circuits 130a via connection means (not shown, e.g. lead wires, pins, or an FPC).

The male control parts 150a are mounted on the male circuit board 140a. The male control parts 150a are connected to the respective male circuits 130a via connection means and the male circuit board 140a. The male circuit board 140a is a microcomputer for controlling the male circuits 130a. It should be appreciated that a single male control part 150a may control a plurality of male circuits 130a.

The cable 160a is led out of the male body 110a. The cable 160a is connected to the male circuit board 140a.

A female connector 100b according to the first embodiment of the invention will be described below with reference to FIG. 3A to FIG. 4B. The female connector 100b includes a female body 110b, a plurality of female conductors 120b, a plurality of female circuits 130b, a plurality of female circuit boards 140b, and a plurality of female control parts 150b. Each constituent of the female connector 100b will be described below in detail.

Figure 3A:
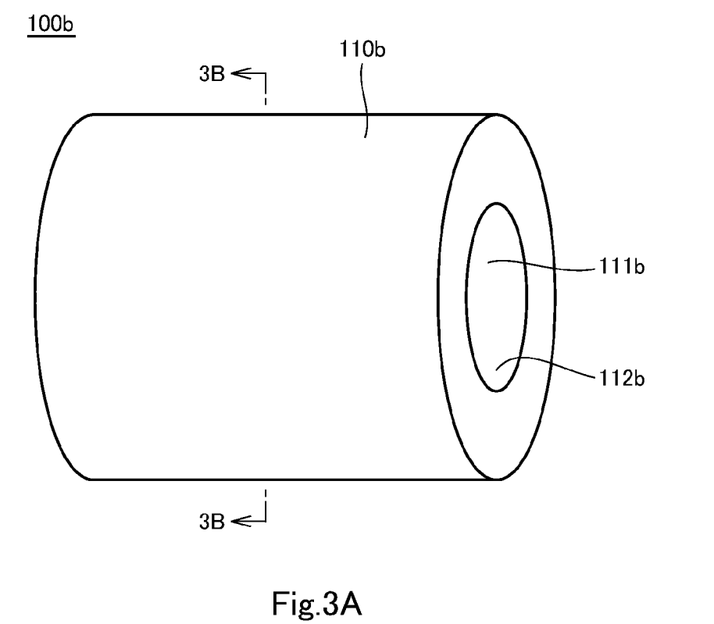
FIG. 3A is a schematic perspective view illustrating the front, top, right side of a female connector according to the first embodiment of the invention.
Figure 3B:
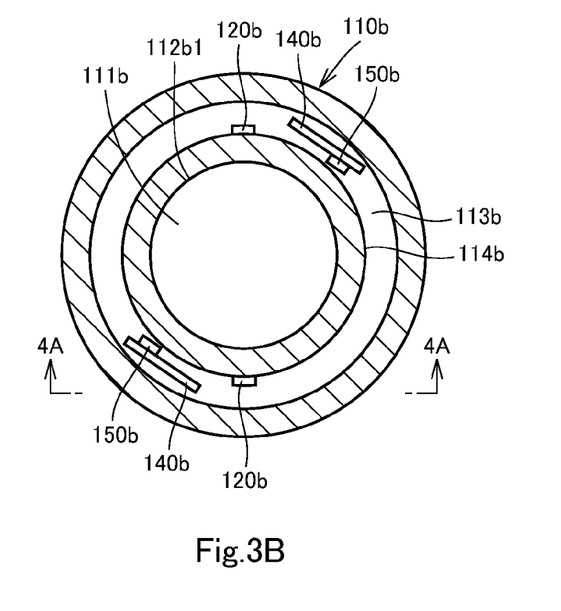
FIG. 3B is a sectional view of the female connector, taken along 3B-3B in FIG. 3A.

The female body 110b is made of insulating resin. As illustrated in FIG. 3A and FIG. 3B, the female body 110b has a connection hole 111b, an inner wall surface 112b of the connection hole 111b, a housing space 113b, and a wall surface 114b of the wall of the housing space 113b. The connection hole 111b is a cylindrical hole in the female body 110b. The connection hole 111b has a diameter corresponding to the outer diameter of the male connector 100a. That is, the male connector 100a is removably insertable into the connection hole 111b. The inner wall surface 112b of the connection hole 111b includes a curved surface 112b1 (first curved face) of cylindrical or tuboid shape. The curved surface 112b1 may be provided with a key ridge or a keyway (not shown) to cooperate with a keyway or key ridge on the male connector when it is inserted, to ensure relative angular alignment between the two parts. The key ridge, if provided, should conform to the keyway of the male connector 100a. The keyway, if provided, should conform to the key ridge of the male connector 100a. The housing space 113b is an enclosed tuboid space located outside the curved surface 112b1 of the connection hole 111b of the female body 110b and in concentric relation to the curved surface 112b1. The wall surface 114b (second curved face) of the housing space 113b is a tuboid curved surface in concentric relation to the curved surface 112b1. That is, the wall surface 114b curves in correspondence with the shape of the curved surface 112b1 of the connection hole 111b. In other words, the wall surface 114b curves such that every point on the functional part 121b (to be described) of each female conductor 120b is located at the same distance to the curved surface 112b1.

As illustrated in FIG. 3B, the conductors 120b of the female connector, referred to as "female conductors 120b", are conductive lines formed on the wall surface 114b of the housing space 113b and located inside the housing space 113b. The female conductors 120b may be formed on the wall surface 114b, e.g. using the Laser Direct Structuring (LDS) technology. Specifically, the wall surface 114b containing an LDS additive may be irradiated with laser light to activate only the areas irradiated with the laser light, and the activated areas are metalized to form plated layers to serve as the female conductors 120b. Alternatively, the conductive lines can be formed on the wall surface 114b by any suitable well-known printing method. In FIG. 3B, the thickness of the female conductors 120b is exaggerated for convenience of illustration.

The female conductors 120b each have a functional part 121b and a connecting part 122b. Each functional part 121b is one of a female communication antenna for wireless signal communication (see FIG. 4A), a female power-reception antennas for wirelessly receiving electric power (see FIG. 4B), and a female power-transmission antenna for wirelessly transmitting electric power (see FIG. 4B). The functional parts 121b curve along the wall surface 114b of the housing space 113b. Since the wall surface 114b curves in correspondence with the shape of the curved surface 112b1 of the connection hole 111b as described above, the functional parts 121b accordingly curve in correspondence with the shape of the curved surface 112b1. This arrangement enables equalization of the distance from the functional parts 121b to the curved surface 112b1 throughout the parts. The connecting parts 122b may curve along the wall surface 114b (see FIG. 4B) or may extend without curving (see FIG. 4A).

Figure 4A:
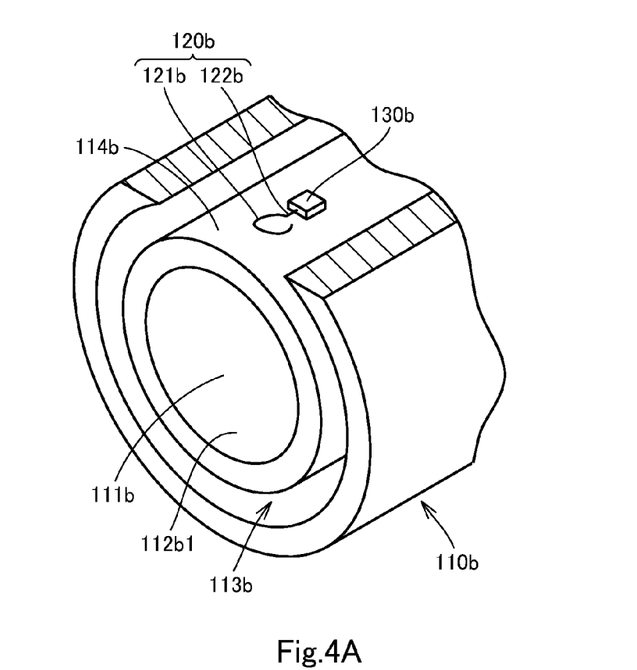
FIG. 4A is a partial sectional view of the female connector, taken along 4A-4A in FIG. 3B, illustrating an example of a female conductor (female communication antenna) of the female connector.
Figure 4B:
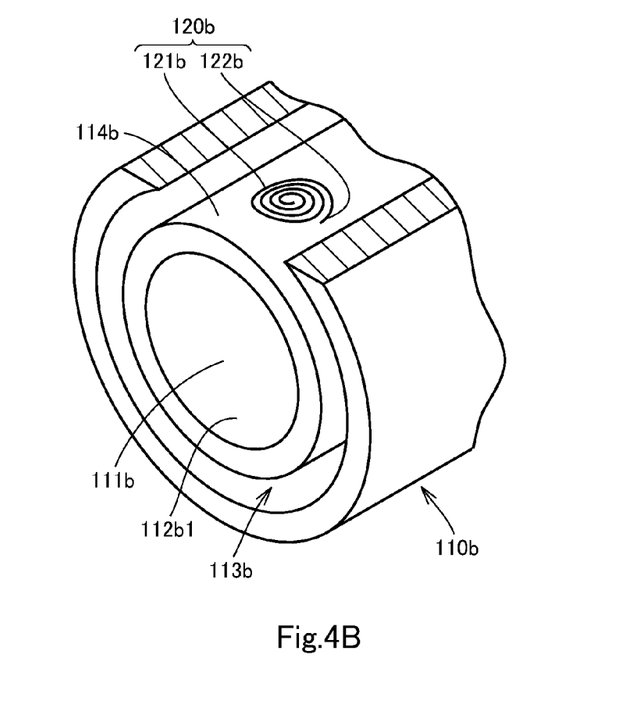
FIG. 4B is a partial sectional view of the female connector, taken along 4A-4A in FIG. 3B, illustrating another example of the female conductor (female power-reception antenna or female power-transmission antenna) of the female connector.

The female circuits 130b may be provided on the wall surface 114b of the housing space 113b as illustrated in FIG. 4A. Alternatively, the female circuits 130b may be provided on the female circuit boards 140b (not shown). In either case, the female circuits 130b are located inside the housing space 113b. The female circuits 130b are electrically connected to the respective connecting parts 122b of the female conductors 120b. In applications where the functional parts 121b of the female conductors 120b are female communication antennas, the female circuits 130b should be ICs (communication circuits) for making the functional parts 121b receive or transmit signals. In applications where the functional parts 121b are female power-reception antennas, the female circuits 130b should be power-reception ICs (power-reception circuits) for converting energy (electromagnetic waves etc.) received at the functional parts 121b into electric power. In applications where the functional parts 121b are female power-transmission antennas, female circuits 130b should be power-transmission ICs (power-transmission circuits) for converting electric power from an external power source (not shown) into form (for example, high-frequency power) suitable for power transmission to the functional parts 121b by electromagnetic induction mode, electromagnetic field resonance mode, electric field coupling mode, or radio wave mode.

The female circuit boards 140b may be rigid printed circuit boards, flexible printed circuit boards (FPCs), or PET circuit boards. The female circuit boards 140b are disposed inside the housing space 113b. The female circuit boards 140b are electrically connected to the connecting parts 122b of the female conductors 120b or the female circuits 130b via connecting means (not shown, e.g. lead wires, pins, or FPCs).

The female control parts 150b are mounted on the respective female circuit boards 140b. The female control parts 150b are connected to the associated female circuits 130b via connecting means and the female circuit boards 140b. The female circuit boards 140b are microcomputers for controlling the respective female circuits 130b. It should be appreciated that a single female control part 150b may control a plurality of female circuits 130b.

Figure 5A:
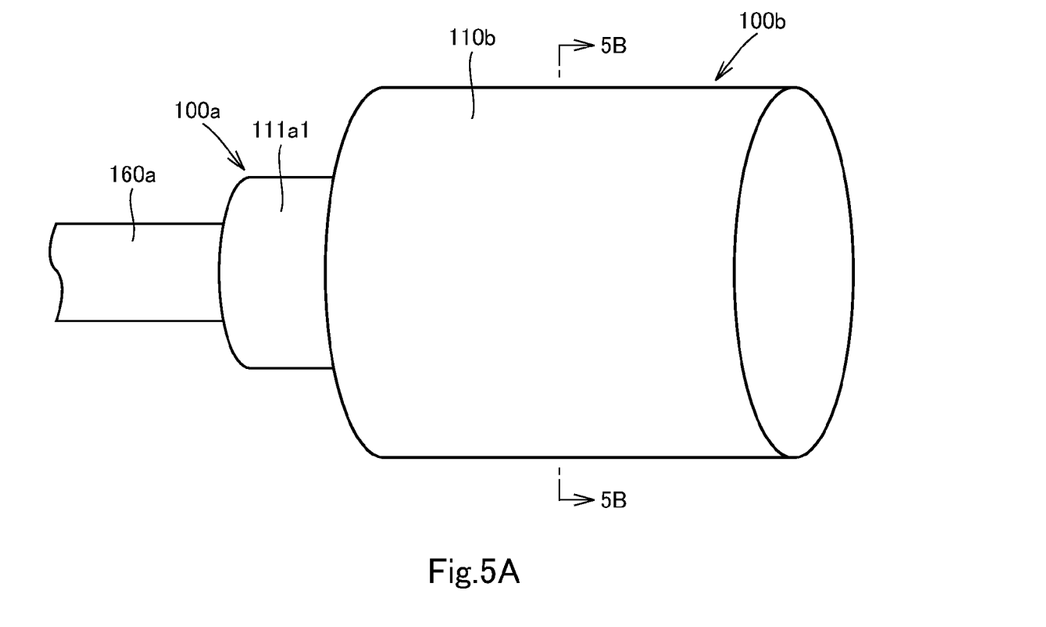
FIG. 5A is a perspective view of the male connector and the female connector as connected to each other.
Figure 5B:
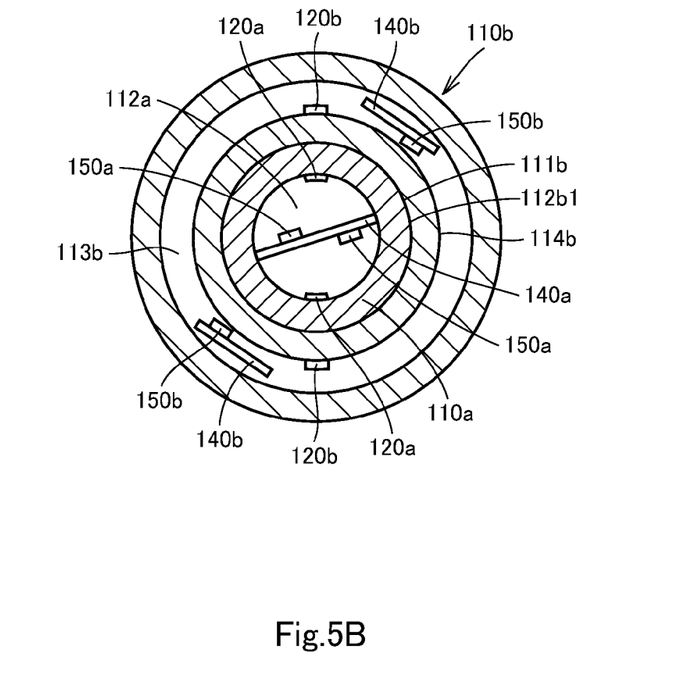
FIG. 5B is a sectional view of the male connector and the female connector, taken along 5B-5B in FIG. 5A.

A procedure of connecting the male connector 100a to the female connector 100b will be described below with reference to FIG. 5A and FIG. 5B. The male body 110a is axially aligned with the connection hole 111b, and the male body 110a is an advanced axially into the connection hole 111b. The key ridge, if provided in one of the male connector 100a and the female connector 100b, is inserted into the keyway of the other connector part. The key ridge is guided by the keyway, so that the male connector 100a fits in the connection hole 111b of the female connector 100b in the desired relative angular relationship.

When the male connector 100a fits in the connection hole 111b of the female connector 100b (hereinafter referred to as the "connected state"), the functional parts 121a of the male conductors 120a of the male connector 100a align with the associated functional parts 121b of the female conductors 120b of the female connector 100b in radial directions of the connection hole 111b. This arrangement allows wireless signal communication or wireless power supply between each functional part 121a and the associated functional part 121b.

The male connector 100a and the female connector 100b described above have at least the following technical features. First, the curved surface 111a1 of the male body 110a of the male connector 100a can be shaped as a tuboid curved surface. This is achieved by providing the male conductors 120a on the wall surface 113a of the housing space 112a of the male body 110a so as to be located inside the housing space 112a. The curved surface 112b1 of the connection hole 111b of the female body 110b of the female connector 100b can also be shaped as a tuboid curved surface. This is achieved by providing the female conductors 120b on the wall surface 114b of the housing space 113b of the female body 110b so as to be located inside the housing space 113b.

Second, the functional parts 121a of the male conductors 120a can be readily curved in correspondence with the shape of the curved surface 111a1 of the male body 110a. This is achieved simply by providing the male conductors 120a on the wall surface 113a of the housing space 112a of the male body because the wall surface 113a 110a curves in correspondence with the shape of the curved surface 111a1 of the male body 110a. The functional parts 121b of the female conductors 120b can also be readily curved in correspondence with the shape of the curved surface 112b1 of the connection hole 111b. This is achieved by simply providing the female conductors 120b on the wall surface 114b of the housing space 113b of the female body 110b because the wall surface 114b curves in correspondence with the shape of the curved surface 112b1 of the connection hole 111b.

Third, the functional parts 121a and 121b are improved in terms of signal transmission efficiency or power supply efficiency for the following reason. In cases where one of a male conductor and a female conductor has a functional part of flat shape while the other of the male conductor and the female conductor has a functional part of curved shape, the distance between the functional parts increases toward the outer sides, deteriorating efficiency in signal transmission efficiency or power supply between the functional parts. In contrast, the curved surface 111a1 of the male body 110a curves in correspondence with the shape of the curved surface 112b1 of the connection hole 111b, the functional parts 121a of the male conductors 120a curve in correspondence with the shape of the curved surface 111a1 of the male body 110a, and the functional parts 121b of the female conductors 120b curve in correspondence with the shape of the curved surface 112b1 of the connection hole 111b. This arrangement enables equalization of the distance between each functional part 121a and the associated functional part 121b throughout the parts, improving efficiency in signal transmission or power supply between the functional parts 121a and 121b.

Second Embodiment

Figure 6:
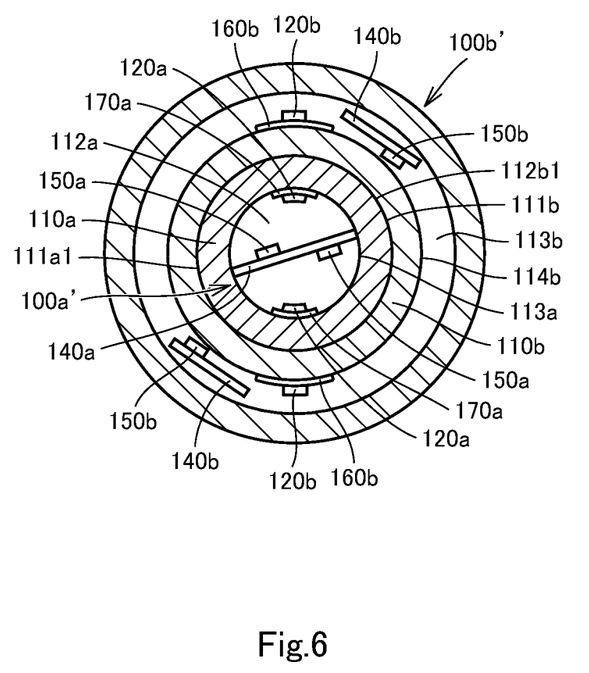
FIG. 6 is a sectional view of a male connector and a female as connected to each other according to the second embodiment of the invention and corresponding to FIG. 5B.

A male connector 100a' according to the second embodiment of the invention will be described below with reference to FIG. 6. The male connector 100a' has substantially the same configuration as that of the male connector 100a of the first embodiment, except that flexible male insulators 170a are provided additionally, and that the male conductors 120a are provided on the respective male insulators 170a, not on the wall surface 113a of the male body 110a. These differences will be described below in detail and overlapping descriptions will be omitted. A prime symbol (') will be added to the reference numeral for the male connector of the second embodiment to distinguish it from the male connector 100a of the first embodiment.

The male insulators 170a are flexible printed circuit boards. The male insulators 170a are fixed to the wall surface 113a of the housing space 112a of the male body 110a and curve along the wall surface 113a. Since the wall surface 113a curves in correspondence with the shape of the curved surface 111a1 of the male body 110a, the male insulators 170a accordingly curve in correspondence with the shape of the curved surface 111a1 of the male body 110a. The male conductors 120a are conductive lines provided on the respective male insulators 170a. Since the male insulators 170a curve as described above, the functional parts 121a of the male conductors 120a accordingly curve in correspondence with the shape of the curved surface 111a1 of the male body 110a. In short, the male insulators 170a curve such that every point on the functional part 121a of each male conductor 120a is located at the same distance to the curved surface 111a1.

A female connector 100b' according to the second embodiment of the invention will be described below with reference to FIG. 6. The female connector 100b' has substantially the same configuration as that of the female connector 100b of the first embodiment, except that flexible female insulators 160b are provided additionally, and that the female conductors 120b are provided on the respective female insulators 160b, not on the wall surface 114b of the female body 110b. These differences will be described below in detail and overlapping descriptions will be omitted. A prime symbol (') will be added to the reference numeral for the female connector of the second embodiment to distinguish it from the female connector 100b of the first embodiment.

The female insulators 160b are flexible printed circuit boards. The female insulators 160b are fixed to the wall surface 114b of the housing space 113b of the female body 110b and curve along the wall surface 114b. Since the wall surface 114b curves in correspondence with the shape of the curved surface 112b1 of the connection hole 111b of the female body 110b, the female insulators 160b accordingly curve in correspondence with the shape of the curved surface 112b1 of the connection hole 111b. The female conductors 120b are conductive lines provided on the respective female insulators 160b. Since the female insulators 160b curve as described above, the functional parts 121b of the female conductors 120b accordingly curve in correspondence with the shape of the curved surface 112b1 of the connection hole 111b. In short, the female insulators 160b curve such that every point on the functional part 121b of each female conductor 120b is located at the same distance to the curved surface 112b1.

A procedure of connecting the male connector 100a' to the female connector 100b' will be described below with reference to FIG. 6. The key ridge, if provided in one of the male connector 100a' and the female connector 100b', is inserted into the keyway of the other connector. The key ridge is guided by the keyway, so that the male connector 100a' fits in the connection hole 111b of the female connector 100b' in the correct relative angular orientation.

When the male connector 100a' fits in the connection hole 111b of the female connector 100b', the functional parts 121a of the male conductors 120a of the male connector 100a' align with the respective functional parts 121b of the female conductors 120b of the female connector 100b' in radial directions of the connection hole 111b. This arrangement allows wireless signal communication or wireless power supply between each functional part 121a and the associated functional part 12b.

It should be appreciated that the male connector 100a' can be connected to the female connector 100b by fitting it into the connection hole 111b of the female connector. Similarly, the male connector 100a can be connected to the female connector 100b' by fitting it into the connection hole 111b of the female connector 100b'.

The male connector 100a' and the female connector 100b' described above have at least the following technical features. First, the curved surface 111a1 of the male body 110a of the male connector 100a' can be shaped as a tuboid curved surface. This is achieved by fixing the male insulators 170a to the wall surface 113a of the housing space 112a of the male body 110a so that the male insulators 170a and the male conductors 120a on the male insulators 170a are located inside the housing space 112a. The curved surface 112b1 of the connection hole 111b of the female body 110b of the female connector 100b can also be shaped as a tuboid curved surface. This is achieved by fixing the female insulators 160b to the wall surface 114b of the housing space 113b of the female body 110b so that the female insulators 160b and the female conductors 120b on the female insulators 160b are located inside the housing space 113b.

Second, the functional parts 121a of the male conductors 120a can be readily curved in correspondence with the shape of the curved surface 111a1 of the male body 110a. This is achieved simply by fixing the male insulators 170a to the wall surface 113a of the housing space 112a of the male body 110a because the wall surface 113a curves in correspondence with the shape of the curved surface 111a1 of the male body 110a. Accordingly, the male insulators 170a and the functional parts 121a of the male conductors 120a curve in correspondence with the shape of the curved surface 111a1 of the male body 110a. The functional parts 121b of the female conductors 120b can be readily curved in correspondence with the shape of the curved surface 112b1 of the connection hole 111b. This is achieved simply by fixing the female insulators 160b to the wall surface 114b of the housing space 113b of the female body 110b because the wall surface 114b curves in correspondence with the shape of the curved surface 112b1 of the connection hole 111b. Accordingly, the female insulators 160b and the functional parts 121b of the female conductors 120b curve in correspondence with the shape of the curved surface 112b1 of the connection hole 111b.

Third, the functional parts 121a and 121b are improved in terms of signal transmission efficiency or power supply efficiency for the following reason. In cases where one of a male conductor and a female conductor has a functional part of flat shape while the other of the male conductor and the female conductor has a functional part of curved shape, the distance between the functional parts increases toward the outer sides, deteriorating efficiency in signal transmission efficiency or power supply between the functional parts. In contrast, the curved surface 111a1 of the male body 110a curves in correspondence with the shape of the curved surface 112b1 of the connection hole 111b, the functional parts 121a of the male conductors 120a curve in correspondence with the shape of the curved surface 111a1 of the male body 110a, and the functional parts 121b of the female conductors 120b curve in correspondence with the shape of the curved surface 112b1 of the connection hole 111b. This arrangement enables equalization of the distance between each functional part 121a and the associated functional part 121b throughout the parts, improving efficiency in signal transmission or power supply between the functional parts 121a and 121b.

The male connector and the female connector described above are not limited to the above embodiments and may be modified in any manner within the scope of the claims. Specific modification will be described below.

The male body of the invention may be modified in any manner as long as it includes an outer face, including a first curved surface, and a housing space on an inner side of the first curved surface of the male body. For example, the male body, if having an outer shape of truncated cone shape, may include an outer face, including a first curved surface of truncated cone shape, and a housing space on an inner side of the first curved surface of the male body. Alternatively, the male body, if having an outer shape of bullet shape, may include an outer face, including a first curved surface of bullet shape, and a housing space on an inner side of the first curved surface of the male body. Still alternatively, the male body, if having an outer shape of semi-cylindrical shape or semi-truncated cone shape, may include an outer face, including a first curved surface of semi-cylindrical shape or semi-truncated cone shape, and a housing space on an inner side of the first curved surface of the male body. Further alternatively, the male body may include an outer face, including a pair of opposed first curved surfaces of arc-shaped section, and at least one housing space on an inner side of the first curved surfaces of the male body. Still alternatively, the male body may include a first body and a second body, and the second body may communicate with the first body and may be smaller in outer dimensions than the first body. In each of such first and second bodies, the outer face may include at least one first curved surface of any of the above aspects. Also, the housing space of the male body may be provided on an inner side of the first curved surface(s) of the first body and/or the second body.

The male body of the invention may have a plurality of housing spaces on an inner side of the first curved surface(s) of the male body of any of the above aspects. In the case where each outer face has a plurality of first curved surfaces, a housing space may be provided on an inner side of each first curved surface. The housing spaces of the male body of the invention are not limited to enclosed spaces inside the male body.

The second curved surface of the male body can be omitted in the invention. The second curved surface of the male body of the invention may be any wall surface of the housing space and may not curve in correspondence with the shape of the first curved surface of the male body. The second curved surface of the male body of the invention may be a wall surface of the housing space, have an insulation property, and curve in correspondence with the shape of the first curved surface of the male body. In the case where the outer face has a first curved surface of semi-cylindrical shape or semi-truncated cone shape as described above, the second curved surface may also be a curved surface of semi-cylindrical shape or semi-truncated cone shape. In the case where the outer face has a plurality of first curved surfaces as described above, a single housing space may be provided including a plurality of second curved surfaces corresponding to the first curved surfaces of the outer face. Alternatively, a plurality of housing spaces may be provided each including one or more second curved surfaces corresponding to one or more first curved surfaces of the outer face. The male body of any of the above aspects may be made of an electrically conductive material, and its housing space(s) may have second curved surface(s) subjected to insulation treatment.

At least one male conductor will suffice in the invention. The male conductor of the invention may be modified in any manner as long as it is disposed inside the housing space of the male body of any of the above aspects and has a functional part, which is one of a male communication antenna, a male power-transmission antenna, and a male power-reception antenna. For example, the functional part may be a conductive line being provided on and curving along a second curved surface of a housing space or on a curved male insulator of any of the above aspects. The functional part may be a conductive line linearly extending on a bottom of a second curved surface of a housing space or on a bottom of a curved male insulator of any of the above aspects. That is, the functional part of the male conductor of the invention need not be curved. The male conductor of the invention may be a coil or terminal to be housed in a housing space.

The male insulators can be omitted in the invention. A single male insulator or a plurality of male insulators may be provided according to the number of the male conductors. A single male insulator may be provided for a plurality of male conductors. The male insulator(s) of the invention may be modified in any manner as long as it is disposed inside the housing space(s) of the male body of any of the above aspects and curves in correspondence with the shape of the first curved surface(s) of the male body. For example, the male insulator(s) may be an insulating spacer or spacers disposed inside a housing space of the male body and may curve in correspondence with the shape of a first curved surface(s) of the male body. The male insulator(s) of any of the above aspects may or may not be fixed to the second curved surface(s) of the housing space(s) of the male body of any of the above aspects. The at least one male conductor may be on the side of a male insulator which is in contact with the associated second curved surface (wall surface) of the male body, or may be provided on the side of the male insulator facing away from the second curved surface (wall surface)

The male circuits can be omitted in the invention. A single male circuit or a plurality of male circuits may be provided according to the number of the male conductors. The male circuit board and/or the male control parts can be omitted in the invention. A single male circuit board or a plurality of male circuit boards may be provided, and a single male control part or a plurality of male control parts may be provided. The male circuit, the male circuit board, and/or the male control part, if omitted from the male connector, may be provided outside the male connector.

The female body of the invention may be modified in any manner as long as it includes a connection hole, an inner wall surface of the connection hole, the inner wall surface including a first curved surface, and a housing space on an outer side of the first curved surface of the connection hole of the female body. For example, the female body may have a connection hole of truncated cone shape, an inner wall surface of the connection hole, the inner wall surface including a first curved surface of truncated cone shape, and a housing space on an outer side of the first curved surface of the connection hole of the female body. Alternatively, the female body may have a connection hole of bullet shape, an inner wall surface of the connection hole, the inner wall surface including a first curved surface of bullet shape, and a housing space on an outer side of the first curved surface of the connection hole of the female body. Still alternatively, the female body may have a connection hole of semi-cylindrical shape or semi-truncated cone shape, an inner wall surface of the connection hole, the inner wall surface including a first curved surface of semi-cylindrical shape or semi-truncated cone shape, and a housing space on an outer side of the first curved surface of the connection hole of the female body. Further alternatively, the female body may have a connection hole, an inner wall surface of the connection hole, the inner wall surface including a pair of opposed first curved surfaces of arc-shaped section, and at least one housing space on an outer side of the first curved surfaces of the connection hole of the female body. Still alternatively, the female body may include a first body and a second body, and the second body may communicate with the first body and may be smaller in outer dimensions than the first body. In each of such first and second bodies, the inner wall surface of the connection hole may include at least one first curved surface of any of the above aspects. Also, the housing space of the female body may be provided on an outer side of the first curved surface(s) of the connection hole(s) of the first body and/or the second body.

The female body of the invention may have a plurality of housing spaces on an outer side of the first curved surface(s) of the female body of any of the above aspects. In the case where each inner wall surface of the connection hole has a plurality of first curved surfaces, a housing space may be provided on an outer side of each first curved surface. The housing spaces of the female body of the invention are not limited to enclosed spaces inside the female body.

The second curved surface of the female body can be omitted in the invention. The second curved surface of the invention may be any wall surface of the housing space and may not curve in correspondence with the shape of the first curved surface of the connection hole. The second curved surface of the female body of the invention may be a wall surface of the housing space, have an insulation property, and curve in correspondence with the shape of the first curved surface of the connection hole of any of the above aspects. In the case where the inner wall surface of the connection hole has a first curved surface of semi-cylindrical shape or semi-truncated cone shape as described above, the second curved surface may also be a curved surface of semi-cylindrical shape or semi-truncated cone shape. In the case where the inner wall surface of the connection hole has a plurality of first curved surfaces as described above, a single housing space may be provided including a plurality of second curved surfaces corresponding to the first curved surfaces of the connection hole. Alternatively, a plurality of housing spaces may be provided each including one or more second curved surfaces corresponding to one or more first curved surfaces of the connection hole. The second curved surface(s) of the housing space(s) of the female body of any of the above aspects may curve in correspondence with the shape of the second curved surface(s) of the male body. The female body of any of the above aspects may be made of an electrically conductive material, and its housing space(s) may have second curved surface(s) subjected to insulation treatment.

At least one female conductor will suffice in the invention. The female conductor of the invention may be modified in any manner as long as it is disposed inside the housing space of the female body of any of the above aspects and has a functional part, which is one of a female communication antenna, a female power-reception antenna, and a female power-transmission antenna. For example, the functional part may be a conductive line being provided on and curving along a second curved surface of a housing space or on a curved female insulator of any of the above aspects. The functional part may be a conductive line linearly extending on a bottom of a second curved surface of a housing space or a bottom of a curved female insulator of any of the above aspects. That is, the functional part of the female conductor of the invention need not be curved. The female conductor of the invention may be a coil or terminal to be housed in a housing space.

The female insulators can be omitted in the invention. A single female insulator or a plurality of female insulators may be provided according to the number of the female conductors. A single female insulator may be provided for a plurality of female conductors. The female insulator(s) of the invention may be modified in any manner as long as it is disposed inside the housing space(s) of the female body of any of the above aspects and curves in correspondence with the shape of the first curved surface(s) of the connection hole of any of the above aspects. For example, the female insulator(s) may be an insulating spacer or spacers disposed inside a housing space of the male body and may curve in correspondence with the shape of a first curved surface(s) of the male body. The female insulator(s) of any of the above aspects may or may not be fixed to the second curved surface(s) of the housing space(s) of the female body of any of the above aspects. The at least one female conductor may be on the side of a female insulator which is in contact with the associated second curved surface (wall surface) of the housing space of the female body, or may be provided on the side of the female insulator facing away from the second curved surface (wall surface).

The female circuits can be omitted in the invention. A single female circuit or a plurality of female circuits may be provided according to the number of the female conductors. The female circuit board and/or the female control parts can be omitted in the invention. A single female circuit board or a plurality of female circuit boards may be provided, and a single female control part or a plurality of female control parts may be provided. The female circuit, the female circuit board, and/or the female control part, if omitted from the female connector, may be provided outside the female connector.

The male connector of the invention may further include a male shield case. The male shield case may preferably enclose or surround at least a part of the male body of any of the above embodiments and modifications. The female connector of the invention may have a shape corresponding to the contour of the male shield case. The female connector of the invention may have a connection hole of a shape corresponding to the contour of the male shield case. The female connector of the invention may further include a female shield case. The female shield case may preferably house at least a part of the female body of any of the above embodiments and modifications. The male and female shield cases may cooperate to provide shielding to the male and female connector parts when the male connector is inserted into the female connector.

It should be appreciated that the male connector and the female connector of the above embodiments are described above by way of examples only and may comprise any materials, shapes, dimensions, numbers, arrangements, and other configurations if they can perform similar functions.

The configurations of the embodiment and the modifications described above may be combined in any possible manner.

REFERENCE SIGNS LIST

100a: male connector
110a: male body
111a: outer face
111a1: curved surface
112a: housing space
113a: wall surface
120a: male conductor
121a: functional part
122a: connecting part
130a: male circuit
140a: male circuit board
150a: male control part
160a: cable
100b: female connector
110b: female body
111b: connection hole
112b: inner wall surface
112b1: curved surface
113b: housing space
114b: wall surface
120b: female conductor
121b: functional part
122b: connecting part
130b: female circuit
140b: female circuit board
150b: female control part
100a': male connector
170a: male insulator
100b': female connector
160b: female insulator

The invention claimed is:

1. A male connector, comprising:
a male body, including:
an outer face including a first curved surface,
a housing space being an enclosed space inside the male body and being located on an inner side of the first curved surface of the male body, and
a second curved surface, the second curved surface being a wall surface of the housing space, curving in correspondence with a shape of the first curved surface of the male body, and having an insulation property; and
a male conductor formed, in its entirety, inside the housing, the male conductor being disposed on the second curved surface and including a functional part,
wherein the functional part of the male conductor curves in correspondence with the shape of the first curved surface, and
wherein the functional part is one of the following:
a male communication antenna configured for wireless signal communication from inside the housing space,
a male power-transmission antenna configured to wirelessly transmit electric power from inside the housing space, or
a male power-reception antenna configured to wirelessly receive electric power inside the housing space.

2. The male connector according to claim 1, wherein the first curved surface of the outer face of the male body is of tuboid shape, and
the second curved surface of the male body is of tuboid shape concentric with the first curved surface of the male body.

3. The male connector according to claim 1, wherein the functional part of the male conductor curves in correspondence with a shape of the first curved surface.

4. The male connector according to claim 1, further comprising a male circuit,
wherein the male conductor further includes a connecting part to be electrically connected to the male circuit.

5. The male connector according to claim 4, wherein the connecting part curves in correspondence with the shape of the first curved surface of the male body.

6. The male connector according to claim 4, further comprising:
a male circuit board inside the housing space of the male body, the male circuit board being electrically connected to the male circuit or to the male conductor; and
a male control part on the male circuit board.

7. A female connector, comprising:
a female body, including:
a connection hole,
an inner wall surface of the connection hole, the inner wall surface including a first curved surface,
a housing space being an enclosed space inside the female body and being located on an outer side of the first curved surface of the connection hole of the female body, and
a second curved surface, the second curved surface being a wall surface of the housing space, curving in correspondence with a shape of the first curved surface of the connection hole, and having an insulation property; and
a female conductor formed, in its entirety, inside the housing space, the female conductor being disposed on the second curved surface and including a functional part,
wherein the functional part of the female conductor curves in correspondence with the shape of the first curved surface,
wherein the functional part is one of the following:
a female communication antenna configured for wireless signal communication from inside the housing space,
a female power-reception antenna configured to wireless receive electric power inside the housing space, or
a female power-transmission antenna configured to wirelessly transmit electric power from inside the housing space.

8. The female connector according to claim 7, wherein
the first curved surface of the inner wall surface of the connection hole is of tuboid shape, and
the second curved surface is of tuboid shape concentric with the first curved surface of the connection hole.

9. The female connector according to claim 7, wherein the functional part of the female conductor curves in correspondence with a shape of the first curved surface of the connection hole.

10. The female connector according to claim 7, further comprising a
female circuit, wherein
the female conductor further includes a connecting part to be electrically connected to the female circuit.

11. The female connector according to claim 10, wherein the connecting part curves in correspondence with the shape of the first curved surface of the connection hole.

12. The female connector according to claim 10, further comprising:

a female circuit board inside the housing space of the female body, the female circuit board being electrically connected to the female circuit or the female conductor; and a female control part on the female circuit board.

13. A combination of a male connector and a female connector, wherein the male connector comprises:

a male body, including:
an outer face including a first curved surface, and
a housing space being an enclosed space inside the male body and being located on an inner side of the first curved surface of the male body; and a male conductor formed, in its entirety, inside the housing space, the male conductor including a functional part, wherein the functional part of the male conductor is one of the following:
a male communication antenna configured for wireless signal communication from inside the housing space,
a male power-transmission antenna configured to wirelessly transmit electric power from inside the housing space, or
a male power-reception antenna configured to wirelessly receive electric power inside the housing space, and wherein the female connector comprises:

a female body, including:
a connection hole,
an inner wall surface of the connection hole, the inner wall surface including a first curved surface, and
a housing space being an enclosed space inside the female body and being located on an outer side of the first curved surface of the connection hole of the female body; and a female conductor formed, in its entirety, inside the housing space, the female conductor including a functional part, wherein the functional part of the female conductor is one of the following:
a female communication antenna configured for wireless signal communication from inside the housing space,
a female power-reception antenna configured to wirelessly receive electric power inside the housing space, or
a female power-transmission antenna configured to wirelessly transmit electric power from inside the housing space, wherein the male connector is connectable to the female connector by inserting the male body into the connection hole of the female connector with the functional part of the male conductor of the male connector aligned with the functional part of the female conductor of the female connector, the functional part of the male conductor curves in correspondence with the shape of the first curved surface of the male body, and the functional part of the female conductor curves in correspondence with the shape of the first curved surface of the female body, so that when the male body of the male connector is inserted into the connection hole of the female connector with the functional part of the male conductor of the male connector aligned with the functional part of the female conductor of the female connector, the distance between the functional part of the male conductor and the functional part of the female conductor is equalized throughout the parts.

14. The combination according to claim 13, wherein
the male body further includes a second curved surface being a wall surface of the housing space of the male body, the second curved surface curving in correspondence with a shape of the first curved surface of the male body and having an insulation property,
the male conductor is disposed on the second curved surface, and
the functional part of the male conductor curves in correspondence with the shape of the first curved surface.

15. The combination according to claim 14, the male connector further comprising a male circuit,
wherein the male conductor further includes a connecting part to be electrically connected to the male circuit.

16. The combination according to claim 13, the male connector further comprising a male insulator inside the housing space of the male body, wherein
the male insulator curves in correspondence with a shape of the first curved surface of the male body,
the male conductor is disposed on the male insulator, and
the functional part of the male conductor curves in correspondence with the shape of the first curved surface.

17. The combination according to claim 16,
wherein
the male body further includes a second curved surface being a wall surface of the housing space of the male body, the second curved surface curving in correspondence with a shape of the first curved surface of the male body, and
the male insulator is fixed to the second curved surface.

18. The male connector combination according to claim 17, wherein
the first curved surface of the outer face of the male body is of tuboid shape, and
the second curved surface of the male body is of tuboid shape concentric with the first curved surface of the male body.

19. The combination according to claim 13, wherein
the female body further includes a second curved surface being a wall surface of the housing space of the female body, the second curved surface curving in correspondence with a shape of the first curved surface of the connection hole and having an insulation property,
the female conductor is disposed on the second curved surface, and
the functional part of the female conductor curves in correspondence with the shape of the first curved surface.

20. The combination according to claim 19, the female connector further comprising a female circuit, wherein
the female conductor further includes a connecting part to be electrically connected to the female circuit.

21. The combination according to claim 13, the female connector further comprising a female insulator inside the housing space of the female body, wherein
the female insulator curves in correspondence with the shape of the first curved surface of the connection hole, and
the female conductor is disposed on the female insulator.

22. The combination according to claim 21, wherein
the female body further includes a second curved surface being a wall surface of the housing space of the female body, the second curved surface curving in correspondence with a shape of the first curved surface of the connection hole, and the female insulator is fixed to the second curved surface.

23. The combination according to claim 22, wherein the first curved surface of the inner wall surface of the connection hole is of tuboid shape, and the second curved surface is of tuboid shape concentric with the first curved surface of the connection hole.

\* \* \* \* \*